April 17, 1934.   F. LEISTER   1,955,302
RIVETING MEANS FOR BALL BEARING CAGES AND THE LIKE
Filed Feb. 28, 1931
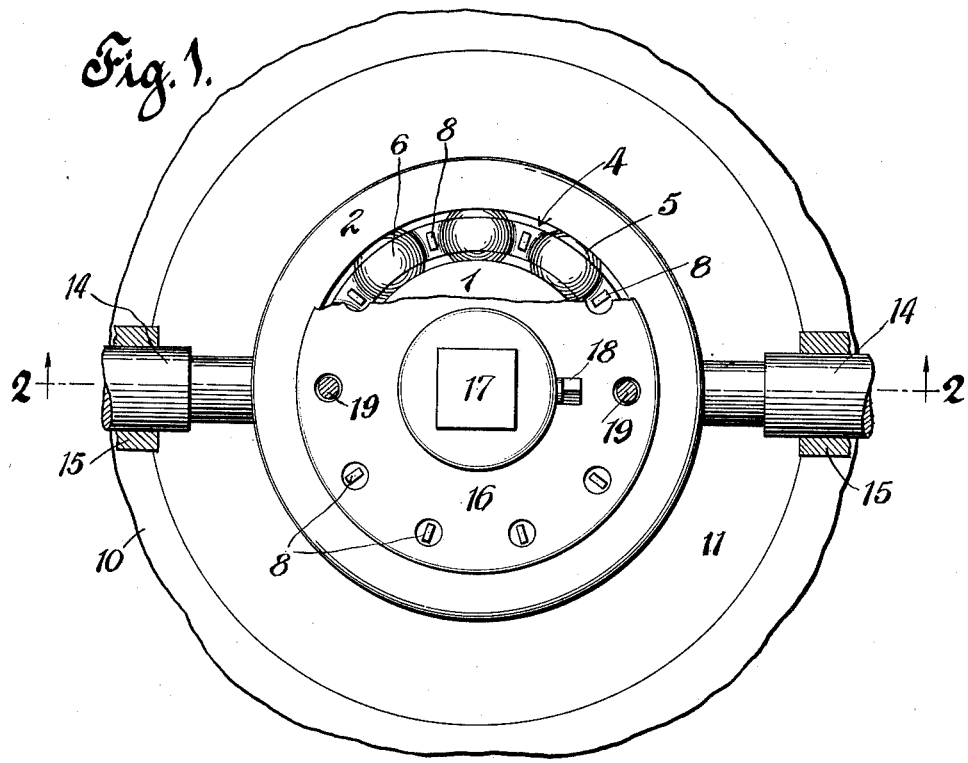
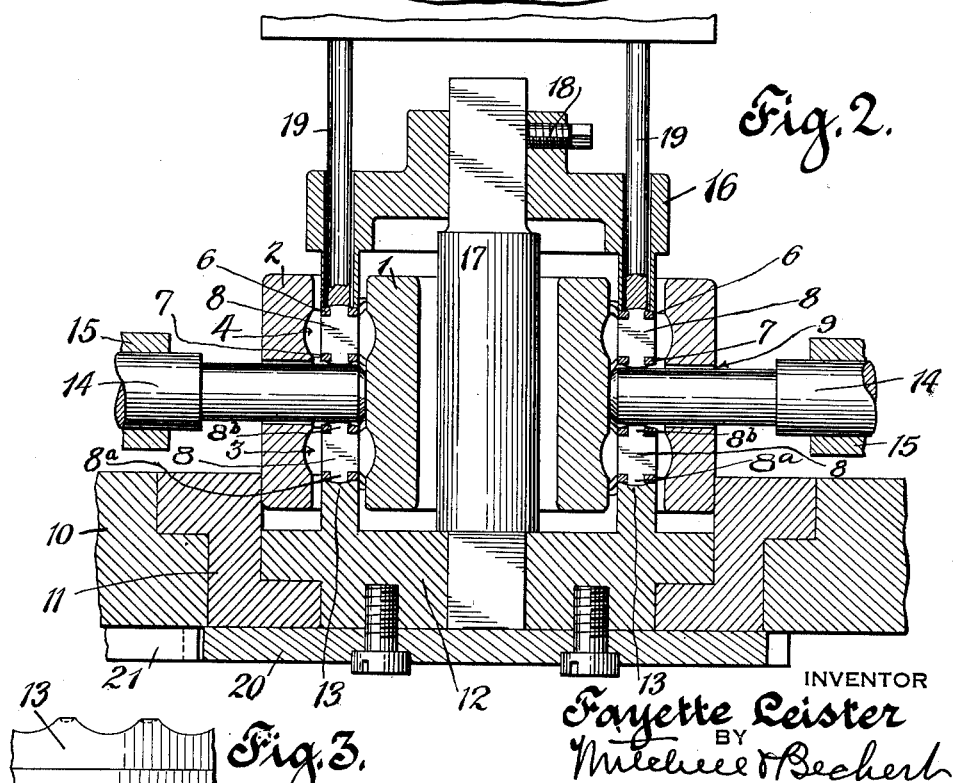
INVENTOR
Fayette Leister
BY
Michael Bechert
ATTORNEYS Patented Apr. 17, 1934

1,955,302

UNITED STATES PATENT OFFICE 1,955,302

RIVETING MEANS FOR BALL BEARING CAGES AND THE LIKE

Fayette Leister, New Britain, Conn., assignor to The Fafnir Bearing Company, New Britain, Conn., a corporation of Connecticut Application February 28, 1931, Serial No. 519,139

5 Claims. (Cl. 78—46)

My invention relates to means for riveting ball bearing cages and the like and more particularly to means for facilitating the assembling of double row ball bearings in which each of the two rows of balls is provided with a ball cage.

It is an object of my invention to provide an improved method and mechanism for assembling ball cages for double row ball bearings in a very simple, rapid, economical and efficient manner.

Other objects will appear upon a reading of the following description and an examination of the accompanying drawing, in which—

Fig. 1 is a plan view, partly broken away and partly in section, showing such parts of a machine for riveting ball bearing cages as are essential to an understanding of the invention;

Fig. 2 is a section on the line 2—2 of Fig. 1;

Fig. 3 is a side elevation of one of the details, broken away.

It is to be understood that I have shown and will describe the invention in one of its preferred forms, being aware that various modifications and changes may be made therein without substantial departure therefrom and without avoiding the scope of the appended claims.

In said drawing I show a double row ball bearing having an inner bearing race member 1 and an outer bearing race member 2 and provided with the usual raceways 3 and 4 in which a double set of balls 5 and ball cages are placed. The ball cage for each set of balls consists of a pair of ring shaped cage members 6 and 7 which are placed on opposite sides of the balls. Connecting means are provided whereby the cage members may be suitably riveted to each other. Separate tie pieces or stay rods may be used for riveting each pair of cage members together, or one or both of the cage members may have integral malleable lips thereon so that the cage members may be riveted together by bending the lips on one of the cage members over the other of the cage members. In the form shown in the drawing, the cage members 6 and 7 are formed to fit the faces of the balls 5, and the stay rods 8 are arranged to pass through holes in the cage members and to have their ends 8ª and 8ᵇ riveted to the cage members. The outer race member 2 has one or more radial holes 9 intermediate the two ball raceways. In the form shown in the drawing there are two of these holes and they are located at opposite sides of the outer ring 2.

Referring now to the machine which I use for the riveting operation, 10 is a base of any suitable form supporting a ring member 11. The ring member 11 has a bore therein which is adapted to fit the exterior of the outer race member 2 so that the ball bearing can be properly located for the riveting operation. 12 is a rotatable table mounted on the ring member 11, said table supporting an annular seat 13 which is suitably shaped as shown in Fig. 3 to receive and support the lowermost cage member when a ball bearing is placed in the position shown in Fig. 2.

14—14 represent rivet backing means which I shall term dolly pins or anvils. These are positioned radially on opposite sides of the ball bearing and may be supported in sleeves 15—15. The dolly pins 14—14 can be entered through the holes 9—9 into the space between the two ball cages so as to function as anvils for the ends of the stay rods 8 during the riveting operation. In Fig. 2 these dolly pins are shown in solid lines in the position they will assume when the riveting operation is to occur and it will be observed that they support the cage member 7 at two spaced points so that the initial riveting operation will tie together the parts 6—7 at two different points sufficiently to prevent displacement of the part 7. If this part should become displaced it might stand in the path of a dolly pin entering for the next riveting operation and be received thereby. 16 is a top clamp having an annular seat at its lower end which is preferably shaped to fit the top cage member of the cage for the upper row of balls. When this clamp is in the position shown in Fig. 2, it will hold the upper ball cage in proper position for the initial riveting of the ends of the stay rods 8 to tie together the cage members 6 and 7 of the upper ball cage. The clamp 16 is mounted on the table 12 so as to turn therewith whereby the cage members and the stay rods will be brought successively into riveting position as the table 12 is turned step by step. For this purpose I provide a pin or pedestal 17 connecting the table 12 and clamp 16. This pin 17 is mounted on the rotatable table 12 to turn therewith. One convenient means for preventing independent rotation of the clamp 16 on the pin 17 comprises squaring the upper end of the pin and correspondingly shaping the pin passage through the clamp. 18 is a set screw for holding the clamp 16 in operative position after the desired vertical adjustment of the clamp 16 has been made. 19—19 are riveting punches or hammers which may be passed down through passages located around the edge of the clamp 16 directly over the stay rods 8. Any suitable means may be employed for operating the punches 19 and the dolly pins 14. 20—21 represent two parts of what I may term an indexing means, which may be of any approved construction, the function of which is to rotate the table 12 and clamp 16 to shift the ball cages step by step at the proper time so as to bring the ends of the stay rods 8 successively into the riveting position. When this shifting is to occur, the dolly pins 14—14 are withdrawn from between the ball cages so as to permit the cages to be turned by the table 12 and clamp 16 to the next position. The dolly pins need not be withdrawn entirely from the outer race member 2 since when they stand therein they hold this member from turning while leaving the cages free to turn. Before the table is rotated the riveting punches 19—19 are of course withdrawn from the clamp 16 to permit the turning of the clamp and the table.

In the usual mode of operation one set of balls and the cage therefor are assembled in one race of a double row ball bearing by any of the usual methods now employed. For example, the balls may be assembled by the usual eccentric displacement of the race members or by the use of so-called filling notches in the race members, both of which methods are too well known to require description. The cage for this set may then be applied without difficulty. The bearing is then put in place with the cage member 8ᵃ resting on the seat 13 which positions the empty race uppermost. The dolly pins 14 are then advanced. Next the lower cage member 7 of the upper cage and the stay rods 8 are placed in the then empty upper ball race and supported on the ends of the dolly pins 14 at points so spaced that when two of the stay rods are riveted the cage member 7 will be so supported that it cannot drop or move out of place at one side. A series of balls, constituting the second set, may then be inserted in the upper race and between the stay rods 8. The upper cage member 6 of the upper cage is then slipped over the top ends of the stay rods 8. Next the top clamp 16 is lowered into the proper position to fit upon and hold the upper cage member 6 of the upper cage in place. Then the set screw 18 is tightened. The riveting punches 19—19 are then lowered into position and the riveting operation is performed, upsetting at one time the ends of the two stay rods 8 preferably at opposite sides of the bearing. When this is done the punches 19 are withdrawn from the top clamp 16 and the dolly pins 14 are retracted from between the cages. The table 12 and clamp 16 are then rotated to shift the cages to the next riveting position. The cage member 7 now being properly held up all around the dolly pins may now be safely advanced to support the next two rivets to be headed and the riveting punches are again lowered and caused to operate. This operation is repeated until the ends of all the stay rods 8 of the upper cage have been properly bent over, upset, or riveted.

When an even number of balls is used in the upper raceway, the passages for the punches 19 in the clamp 16 and the holes 9 in the outer race member 2 for the dolly pins 14 are preferably diametrically opposed. When an odd number of balls is used, the punches, the passages for the punches, the dolly pins, and the holes 9 for the dolly pins, are sufficiently offset from a diameter so that when the dolly pins are entered between the ball cages they will stand under the two punches and will stand between the ends of the stay rods so as to act as anvils therefor.

I have not shown the means for operating the riveting punches 19—19, nor have I described in detail the means for reciprocating the dolly pins 14—14, since any well known means may be employed. By the term "riveting" as used herein, I mean to include any operation that will bend or deform the ends of the stay rods or other malleable parts so that the cage members will be held together.

When the dolly pins 14 are only loosely supported they act as intermediate anvils or fillers for transmitting the force of the punches 19 from the stay rods of the upper cage to the stay rods of the lower cage. In such case the annular seat 13 is the true anvil and the stay rods of both cages can be riveted in the same operation.

I claim:

1. Means for riveting the ends of the stay rods of the ball cages in a double row ball bearing having two ball cages and in which one race member has a plurality of spaced passages intermediate the two ball raceways, said means comprising a rotatable support, two reciprocatory anvils insertible through said passages into the space between the cages, to hold the same in definite spaced relation, means to initially rivet two stay rods, at opposite sides of said bearing, and means to thereafter rotate said cages so that said hammer and at least one of said anvils can cooperate to rivet with the ends of the balance of the stay rods.

2. Means for riveting together the parts of ball cages in double row ball bearings having two ball cages, comprising a table engaging the outer side of one of such cages and a clamp engaging the outer side of the other cage, said table and said clamp being connected to each other so as to hold the stay rods of both cages in line, rivet backing means insertible between said cages and between the inner ends of two aligned stay rods, riveting means for upsetting one end of one of said stay rods, and means to rotate said cages from one position to another to present another set of stay rods to the action of said riveting means.

3. Means for riveting the ends of the stay rods of ball cages in a double row ball bearing having two ball cages, comprising a rotatable table engaging the outer end of a stay rod for one of such cages, a rotatable clamp engaging the outside of the other cage to hold the stay rods of both cages in line, rivet backing means insertible between the inner ends of two aligned stay rods, riveting means on the opposite side of said two cages from said table for upsetting the ends of said stay rods, and means to rotate said table and clamp together so as to present the stay rods successively to the action of the riveting means.

4. A machine for riveting together the parts of ball cages in a double row ball bearing having two ball cages and in which one race member has a plurality of radial passages intermediate the two ball raceways, said machine comprising, a rotatable table having an annular seat adapted to support one of said ball cages, a clamp having an annular seat adapted to fit the other of said ball cages, said table and said clamp being connected to each other so that said clamp will turn with said table, reciprocatory dolly pins insertible through said passages into the space between the cages, and a hammer, said hammer and one of said dolly pins cooperating with one of said ball cages to rivet the parts of said cage together.

5. A machine for riveting the ends of the stay rods of the ball cages in a double row ball bearing having two ball cages and in which one race member has a plurality of radial passages intermediate the ball raceways, said machine comprising, a rotatable table having an annular seat adapted to conform to the outer surface of one of said ball cages, a clamp having an annular seat adapted to conform to the outer surface of the other of said ball cages, said table and said clamp being connected to each other so as to maintain the stay rods of one of said ball cages in constant alignment with the stay rods of the other of said ball cages, reciprocatory dolly pins each insertible through one of said passages into the space between the ends of a pair of aligned stay rods, and a hammer, said hammer and one of said dolly pins cooperating with the ends of one of said stay rods to rivet the ends of said rod.

FAYETTE LEISTER.